(12) United States Patent
Masson et al.

(10) Patent No.: US 11,175,505 B2
(45) Date of Patent: Nov. 16, 2021

(54) HOLOGRAPHIC OPTICAL ELEMENTS FOR AUGMENTED REALITY DEVICES AND METHODS OF MANUFACTURING AND USING THE SAME

(71) Applicant: Intel Corporation, Santa Clara, CA (US)

(72) Inventors: Jonathan Masson, Pully (CH); Eric Tremblay, Eclubens (CH); Lucio Kilcher, Montreux (CH); Mickael Guillaumee, Neuchâtel (CH)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 16/139,661

(22) Filed: Sep. 24, 2018

(65) Prior Publication Data

US 2019/0041565 A1     Feb. 7, 2019

(51) Int. Cl.
*G02B 5/32*     (2006.01)
*G02B 27/30*    (2006.01)
*G02B 27/09*    (2006.01)
*G02B 27/01*    (2006.01)
(Continued)

(52) U.S. Cl.
CPC ..... *G02B 27/0172* (2013.01); *G02B 27/0103* (2013.01); *G02B 27/017* (2013.01); *G02B 5/32* (2013.01); *G02B 27/0101* (2013.01); *G02B 27/0961* (2013.01); *G02B 2027/0105* (2013.01); *G02B 2027/0174* (2013.01); *G02B 2027/0178* (2013.01); *G03H 1/0248* (2013.01); (Continued)

(58) Field of Classification Search
CPC ............ G02B 27/0172; G02B 27/0103; G02B 27/017; G02B 2027/0105; G02B 2027/0174; G02B 2027/0178; G02B 5/32; G02B 27/0101; G02B 27/0961; G02B 2027/0125; G03H 2001/0415; G03H 2223/19; G03H 1/0248; G03H 2001/0439; G03H 1/041
USPC ...................................... 359/13–15
See application file for complete search history.

(56) References Cited

U.S. PATENT DOCUMENTS

| | | | | |
|---|---|---|---|---|
| 5,379,132 A | * | 1/1995 | Kuwayama | G02B 3/005 345/7 |
| 2002/0054275 A1 | * | 5/2002 | Yamanaka | G03B 21/26 353/30 |

(Continued)

FOREIGN PATENT DOCUMENTS

JP     2002290966     * 10/2002  .............. H04N 7/18

*Primary Examiner* — George G King
(74) *Attorney, Agent, or Firm* — Hanley, Flight & Zimmerman, LLC

(57) ABSTRACT

Holographic optical elements for augmented reality (AR) devices and methods of manufacturing and using the same are disclosed. An example AR device includes a holographic optical element (HOE) including a recorded optical function, and a projector to emit light toward the HOE. The HOE reflects the light based on the optical function to produce a full image corresponding to content perceivable by a user viewing the reflected light from within an eyebox. A first portion of the content is viewable from a first location within the eyebox. A second portion of the content is viewable from a second location within the eyebox. The first portion including different content than the second portion that is non-repeating between the first and second portions.

10 Claims, 11 Drawing Sheets

(51) Int. Cl.
*G03H 1/04* (2006.01)
*G03H 1/02* (2006.01)

(52) U.S. Cl.
CPC ..... *G03H 1/041* (2013.01); *G03H 2001/0415* (2013.01); *G03H 2001/0439* (2013.01); *G03H 2223/19* (2013.01)

(56) References Cited

U.S. PATENT DOCUMENTS

2016/0033771 A1* 2/2016 Tremblay ............... G02B 26/10 345/8
2018/0095278 A1 4/2018 Masson

* cited by examiner

HOLOGRAPHIC OPTICAL ELEMENTS FOR AUGMENTED REALITY DEVICES AND METHODS OF MANUFACTURING AND USING THE SAME

FIELD OF THE DISCLOSURE

This disclosure relates generally to augmented reality and, more particularly, to holographic optical elements for augmented reality devices and methods of manufacturing and using the same.

BACKGROUND

Augmented reality (AR) involves the integration of computer-generated perceptual information with a user's perception of the real world. Many existing AR systems include head-mounted displays and/or other systems that are relatively bulky or cumbersome because of the components needed to generate the computer-generated perceptual information at sufficient speeds and with a sufficient field of view and resolution desired for the particular application.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
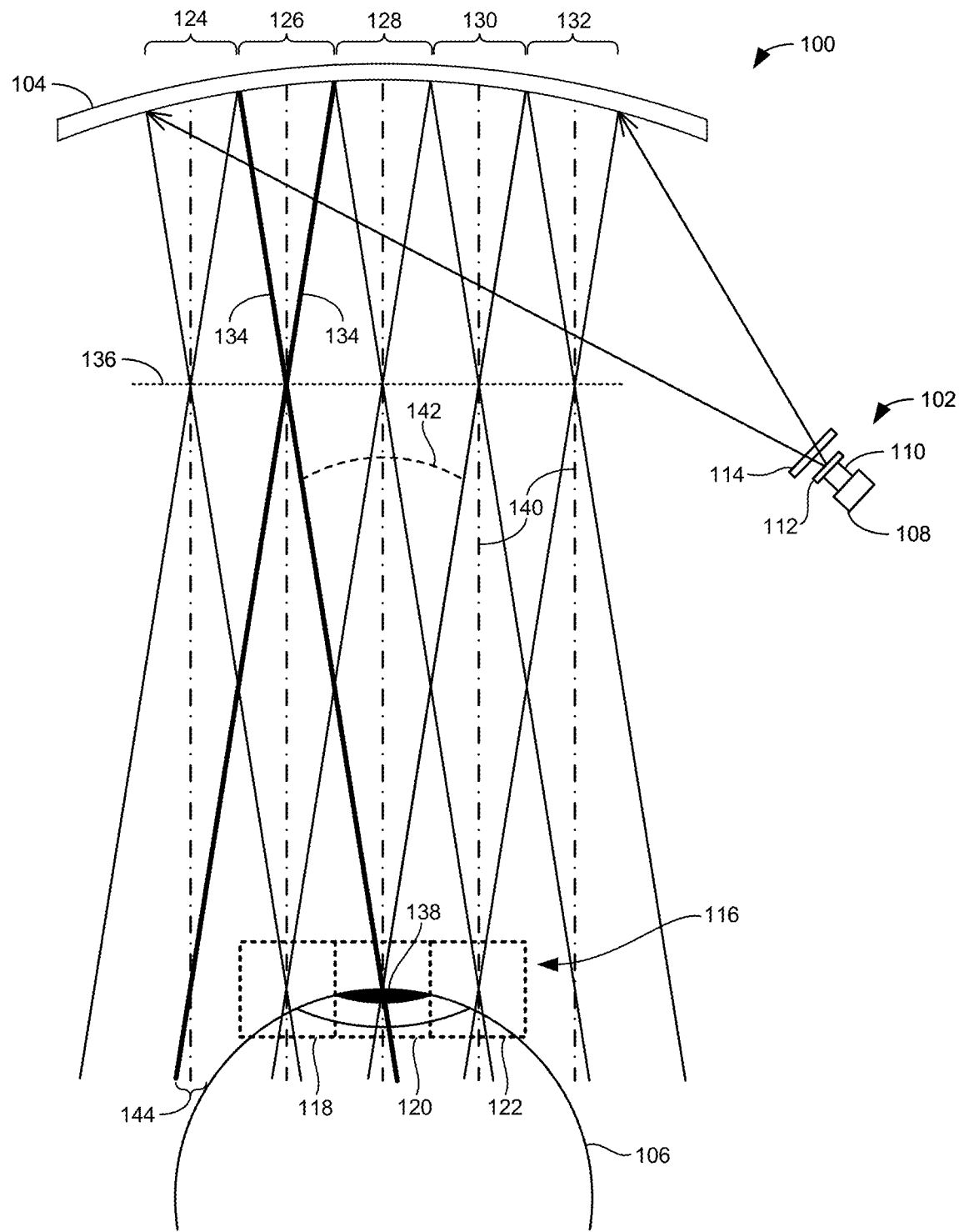
FIG. 1 illustrates a prior AR system with a holographic optical element (HOE) including an optical function recorded therein.

In current wearable augmented reality (AR) glass solutions, a tradeoff always exists between the optical engine size (e.g., the size of components that generate the light to produce a user-perceived image), eyebox size, field of view (FOV), and resolution. Furthermore, many current AR solutions cannot be implemented in normal eyewear (e.g., prescription glasses, sunglasses, etc.) with curved lenses and relatively small frames because such existing AR solutions require flat glass lenses (and/or panel displays), bulky "bug eye" style optical combiners (e.g., combining prisms and/or flat waveguide combining optics), and/or components with form factors that cannot be concealed within the frames designed for most normal eyewear.

However, there are some solutions that involve an optical engine based on a microelectromechanical system (MEMS) scanner that is sufficiently small to fit on the frame of normal eyewear. Furthermore, the MEMS scanner may be implemented in conjunction with a holographic optical element (HOE) (also referred to as a holographic combiner) that is curved in a manner corresponding to the curvature of lenses used in normal eyewear. The holographic combiner reflects light from the MEMS scanner towards a user's eye to enable the user to perceive an image represented by the reflected light. For a user to perceive the image, the user's eye needs to be positioned within a particular location relative to the HOE so that the reflected light enters the pupil of the user's eye. The location in which a user's pupil must be located to perceive the reflected image is referred to herein as the eyebox.

In some implementations of this approach, the image projected by the MEMS scanner and reflected by the HOE is relatively small, which results in a relatively small eyebox. That is, the user's eye must be in a relatively precise position to perceive the image. It is possible to increase the effective or overall eyebox size for such AR systems by generating an array of multiple separate eyeboxes corresponding to multiple instances of the image to be perceived by users. In this manner, as users move their eye, their pupil will remain in at least one eyebox to maintain visibility of the reflected image. The multiple eyeboxes may be generated based on multiple light sources. That is, each eyebox is generated based on output from a separate light source (e.g., a separate set of one or more lasers).

While the above "multiple eyebox" approach enables small AR systems that can provide computer-generated perceptible information on curved combiners integrated with a lens for normal eyewear, known implementations of such an approach include several limitations to their utility. For example, such solutions are limited to monochromatic images using red lasers having different wavelengths (e.g., for dark, intermediate, and light red) because green or blue laser sources cannot be manufactured small enough to fit within the relatively small form factors needed to incorporate such AR systems into normal eyewear. Furthermore, the small form factor for the AR system limits the total number of separate light sources that can be included in the system, thereby still limiting the overall eyebox size (e.g., the total size of the two or more eyeboxes) to a relatively small area.

FIG. 1 illustrates a prior AR system 100 that improves upon the MEMS scanner-based system described above. The AR system 100 of FIG. 1 includes a projector 102 that projects light onto the surface of a HOE 104 that, in turn, reflects the light towards an eye 106 a of user of the AR system 100. The HOE 104 includes an optical function that was previously recorded into the HOE 104. As used herein, an optical function of a HOE defines the optical characteristics corresponding to how light is reflected or transmitted through the HOE. Thus, the way in which the light from the projector 102 is reflected off the HOE 104 of FIG. 1 is based on the optical function of the HOE 104. As described more fully below, the optical function of a HOE can be specifically designed and recorded into the HOE based on specific interferences of light passing through an unprocessed HOE. Thus, the optical function of a HOE may be designed independent of the shape of the HOE, which enables HOEs with different optical functions to nevertheless have the same shape corresponding to lenses of normal eyewear (or any other suitable shape).

As shown in FIG. 1, the projector 102 includes at least one light source 108, a collimation lens 110, a MEMS scanner 112 (also referred to herein as a scanning mirror), and a projection lens 114. The light source 108 may include one or more of a vertical-cavity surface-emitting laser (VCSEL), an edge emitting laser, a micro light emitting diode (LED), a resonant cavity LED, a quantum dot laser, or any other suitable light source. The ability to use standard laser diodes enables the creation images based on red, green, and blue lasers for full-color images. Thus, while the light source 108 is represented as a single unit, the light source 108 may include a plurality of light sources. For instance, the light source 108 may include a red light source (e.g., a red laser), a green light source (e.g., a green laser), and a blue light source (e.g., a blue laser), also referred to herein as an RGB light source.

The collimation lens 110 collimates the light generated by the light source 108 and directs the collimated light towards the scanning mirror 112. The scanning mirror 112 changes position (e.g., rotates on an axis) to reflect the collimated light at different angles, thereby redirecting the light, via the projection lens 114, towards different areas on the surface of the HOE 104. In some examples, the scanning mirror 112 moves relative to two different axes to produce a two-dimensional projection. The projection lens 114 may correct optical aberrations such as astigmatism, coma, keystone, or the like. The collimation lens 110 and/or the projection lens 114 may have an adjustable focal length to enable adjustments to the location of an overall eyebox 116 for the AR system 100.

As mentioned above, to enlarge the size of the overall eyebox 116, the overall eyebox 116 is implemented by an array of multiple individual eyeboxes 118, 120, 122. As shown in FIG. 1, the separate individual eyeboxes 118, 120, 122 align with corresponding ones of multiple different sub-images 124, 126, 128, 130, 132 reflected off the HOE 104. In the illustrated example, each of the sub-images 124, 126, 128, 130, 132 includes identical content. That is, the sub-images 124, 126, 128, 130, 132 repeat from one sub-image to the next such that a user perceives the same information represented by the sub-images regardless of the location of the user's eye within the overall eyebox 116.

Depending on eye position, the image perceived by users corresponds to the content represented in one or more of the individual sub-images 124, 126, 128, 130, 132. However, because the sub-images are the same, the location of the eye does not change the perceived content. Nevertheless, depending on the location of the eye 106 within the overall eyebox 116, the perceived image may be composed of the light from more than one of the sub-images 124, 126, 128, 130, 132. For example, the path of reflected light corresponding to the second sub-image 126 is represented by the thick lines 134 shown in FIG. 1. Based on the particular optical function recorded in the HOE 104, the HOE 104 causes the light to converge to a focal point (i.e., the point where the two thick lines 134 cross in FIG. 1). As shown in FIG. 1, the light associated with each of the sub-images 124, 126, 128, 130, 132 converges to a corresponding focal point at a similar distance from the HOE 104 to define a focal plane 136 for the HOE 104. As the light associated with each sub-image 124, 126, 128, 130, 132 continues past the focal plane 136, the light diverges until it overlaps with light from other sub-images (e.g., within the individual eyeboxes 118, 120, 122). The overall eyebox 116 is positioned at a distance from the HOE 104 where light from different ones of the sub-images 124, 126, 128, 130, 132 may be overlapping such that light from the different ones of the sub-images enters the pupil 138 of the eye 106 at the same time for different positions of the eye 106 within the eyebox 116. The portion of light from a particular sub-image received into the pupil 138 that contributes to the resulting image perceived by the user depends upon the position of the eye 106 within the overall eyebox 116. For example, as shown in FIG. 1, when the user's pupil 138 is centered in the center eyebox 120, only a small portion of the path of reflected light 134 associated with the second sub-image 126 enters the user's pupil 138. As such, the light from the second-sub-image contributes only a small portion to the perceived image viewed by users with their eye 106 in the position as shown in FIG. 1. If the eye 106 were to move to the left in the illustrated example (e.g., towards the left-most eyebox 118 of FIG. 1) a greater portion of the light associated with the second sub-image 126 would contribute to the image perceived by the user.

Although light from more than one sub-image 124, 126, 128, 130, 132 may enter the eye 106 of a user for any given position of the eye 106, the angle of such light as reflected from the HOE 104 is such that the light from the different sub-images is combined to compose a consistent single instance of the content represented by any one of the sub-images 124, 126, 128, 130, 132 as perceived by the user. That is, as a user moves their eye 106 within the overall eyebox 116, the user will continuously perceive a complete representation of the content represented by the sub-images as if the user was viewing the entire content of only one of the sub-images 124, 126, 128, 130, 132. Light from multiple different sub-images combine to compose a single representation of the content due to the HOE 104 reflecting, based on the optical function, the light such that the chief rays (represented by the alternating dotted and dashed lines 140) of light associated with each sub-image are parallel to the chief rays 140 associated with the other sub-images. As used herein, the term "chief ray" refers to the central ray of each sub-image 124, 126, 128, 130, 132 reflected by the HOE 104. Thus, as shown in FIG. 1, the chief rays for the sub-images are neither converging nor diverging. The parallel nature of the chief rays 140, as shown in FIG. 1, result in the chief rays converging (after passing through the lens of the eye 106) to a single point on the retina of the eye 106, thereby creating a single pixel of a single image perceived by the user.

The field of view (FOV) for an AR system corresponds to the angular proportion of a full image that is visible to a user at a given point in time. As used herein, the "full image" refers to all of the light projected onto the HOE. Thus, the sum of the light from all of the sub-images 124, 126, 128, 130, 132 is the full image of the AR system 100 of FIG. 1. The FOV for the AR system 100 of FIG. 1, from the view point of the eye 106, is represented by the dashed line 142. As shown in FIG. 1, the FOV 142 corresponds to the area of the three central sub-images 126, 128, 130 and excludes the outer two sub-images 124, 132. While the FOV 142 is less than the total image field of the full image, as described above, users nevertheless perceive the entire content represented by the sub-images (referred to herein as the perceived image) because the perceived image at any given time (e.g., at any position of the eye in the eyebox) is limited to the content represented by a single sub-image. The multiple sub-images serve to enlarge the eyebox 116 so that the same perceived image may be viewed as the eye 106 moves around within a larger area rather than being limited to a precise location.

The size of the FOV 142 is dependent on the focal length of the HOE 104 with respect to each sub-image. The focal length of the HOE 104 is related to the distance between the HOE 104 and the focal plane 136. As the focal length (and corresponding distance to the focal plane 136) of the HOE 104 decreases, the FOV increases. However, decreasing the focal length in this manner results in a reduction in the resolution of the perceived image because the full image (corresponding to the combination of all the sub-images) will take up a smaller area and because there will be more diffraction. The size of the FOV 142 is also dependent on the size of the individual sub-images 124, 126, 128, 130, 132. In particular, a larger FOV can be achieved by increasing size of the sub-images 124, 126, 128, 130, 132. Furthermore, larger sub-images also achieves higher resolution because, as described above, the perceived image at any discrete eye position within the eyebox 116 corresponds to the content represented by a single one of the sub-images. Therefore, the resolution of the perceived image is tied to the resolution of a single one of the sub-images. However, there are practical limits to how large each sub-image can be because increasing the sub-image size also increases the distance between adjacent ones of the individual eyeboxes 118, 120, 122. If the eye boxes are spaced apart by a distance that is greater than the diameter of the pupil 138 of a user, the light from different ones of the sub-images would not be able to combine to form a complete perceived image. Rather, the user would see only portions of the image at any one point in time with discontinuities or gaps between the different portions as the user moved their eye around from one individual eyebox to the next.

Thus, while shorter focal lengths and larger sub-images result in a larger FOV, the shorter focal lengths lead to lower resolutions and the size of the sub-images are limited to relatively small areas (defined by the size of the pupil 138) also resulting in relative low resolutions. As such, a tradeoff between (1) a larger FOV or (2) a higher resolution must be made. In addition to limits on the size of the FOV relative to the available resolution, the AR system 100 also presents certain inefficiencies. As mentioned above, depending on the location of a user's eye 106, a greater or lesser portion of the light from any particular sub-image 124, 126, 128, 130, 132 may enter the pupil 138 with the remaining portion of light not being perceived by the user. For some sub-images, there may be a portion of associated light that will never enter the eye 106. For example, as shown in FIG. 1, a portion 144 of the light associated with the second sub-image 126 will never enter the pupil 138 of the eye 106 (regardless of the eye's position) because it is angled away from the eye 106. An even greater portion of the light associated with the first sub-image 124 never reaches the user's eye 106. The light that never hits the user's eye 106 can never be perceived by the user and, thus, is wasted light that translates into unnecessary consumption of power and processing capacity to pulse the light source 108 and direct the scanning mirror 112 to produce this light.

Examples disclosed herein overcome at least some of the limitations of the prior AR system 100 of FIG. 1 by achieving greater resolution without being limited by an overly narrow FOV. Furthermore, examples disclosed herein achieve greater efficiency because more (e.g., all) of the light projected onto a HOE is reflected towards a user's eye so that less light is wasted or lost by never hitting the eye. In some examples, no light is lost by directed all light toward an eyebox where the light may be perceived by users.

Figure 2:
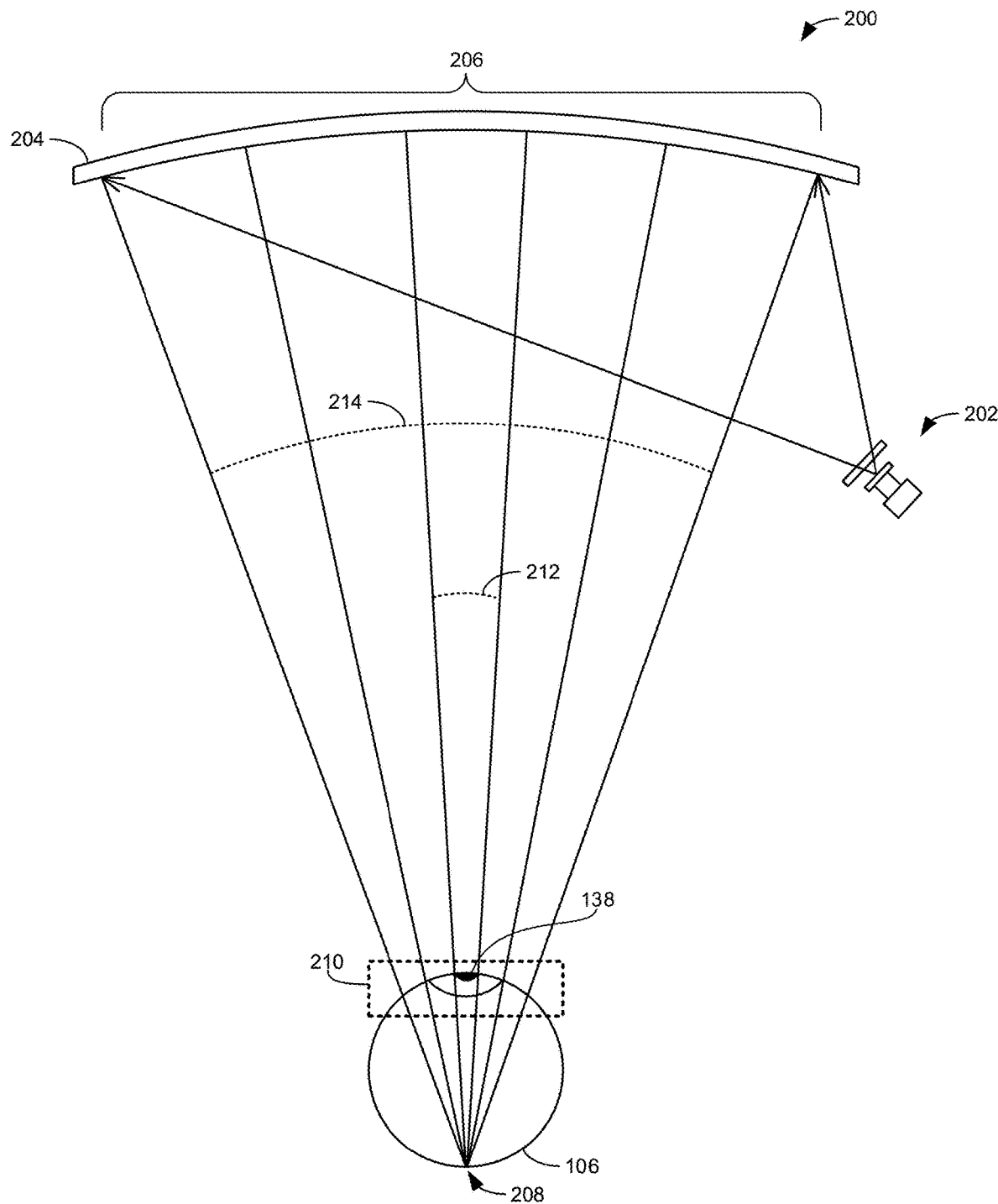
FIG. 2 illustrates an example AR system with an example HOE including a different example optical function.

FIG. 2 illustrates an example AR system 200 that includes a projector 202 and a HOE 204. In this example, the projector 202 of FIG. 2 is similar or identical to the projector 102 of FIG. 1. However, the content represented by the full image (e.g., all the light) projected from the projector 202 of FIG. 2 is different than the content represented by the full image (e.g., all the light) projected from the projector 102 of FIG. 1. In particular, as shown and described in connection with FIG. 1, the full image projected from the projector 102 corresponds to a plurality of sub-images 124, 126, 128, 130, 132, each having the identical content. Only one instance of the content of the sub-images 124, 126, 128, 130, 132 is perceived by the user at a given time such that the resolution of the AR system 100 of FIG. 1 is defined by the size of a single one of the sub-images 124, 126, 128, 130, 132. That is, the perceived image in FIG. 1 (corresponding to the content of a single sub-image) is much smaller than the full image (corresponding to all the sub-images collectively). By contrast, the full image projected from the projector 202 of FIG. 2 corresponds to a single unitary image 206 that may be perceived by a user. As such, the resolution of the AR system 200 of FIG. 2 is defined by the size of the full image (e.g., the unitary image 206) with the possibility of every portion of the full image containing different, non-repeating content. Of course, there is nothing preventing the unitary image 206 of FIG. 2 from containing similar or repeating content within different regions of the image. However, such regions correspond to different parts of the entire content that may be perceived by a user rather than duplicate parts of the same content as is the case with the sub-images 124, 126, 128, 130, 132 of FIG. 1. That is, the perceived image in FIG. 2 is the same as the full image, both of which correspond to the unitary image 206.

The HOE 204 of FIG. 2 includes a different optical function than the HOE 104 of FIG. 1 such that the light from the projector 202 in FIG. 2 is reflected in a different manner than in FIG. 1. In particular, the optical function recorded in the HOE 104 of FIG. 1 causes the light from discrete portions of the full image (corresponding to the individual sub-images 124, 126, 128, 130, 132) to converge at a focal plane 136 and then begin to diverge before reaching the eyebox 116 where the eye 106 is located. By contrast, the optical function recorded in the HOE 204 of FIG. 2 causes the full image (e.g., corresponding to the unitary image 206) to converge towards a focal point 208 that is beyond an eyebox 210 where the pupil 138 of the eye 106 is to be located. In the illustrated example of FIG. 2, the focal point is located at the back of the user's eye 106 but may be positioned at different distances either inside the eye 106 or behind the back of the eye 106. Further, whereas the HOE 104 of FIG. 1 reflects the projected light so that the chief rays 140 associated with the sub-images 124, 126, 128, 130, 132 are parallel to one another, the HOE 204 of FIG. 4 causes the all the rays associated with the unitary image 206 to converge towards the focal point.

Causing the light to converge behind the user's pupil 138, as shown in FIG. 2, enables a larger individual eyebox 210 in which the unitary image 206 may be viewed as compared with the size of the individual eyeboxes 118, 120, 122 of FIG. 1. However, the arrangement shown in FIG. 2 also decreases the FOV (represented by the dashed line 212) relative to a total image field 214 corresponding to the full image of projected light (e.g., the unitary image 206 in this example). Furthermore, due to the relatively small FOV 212 and relatively large size of the unitary image 206, only a portion of the unitary image 206 is viewable from the eyebox 210 at any given time. By moving their eye within the eyebox 210, users may view other portions of the unitary image 206 such that the entire image 206 is viewable, just not all at once. While the FOV 212 is relatively small, using the unitary image 206 as the full image projected from the projector 202 as shown in FIG. 2 enables a much larger resolution for the perceived image. Thus, FIG. 2 represents a trade off between the FOV 212 and resolution in favor of higher resolution.

Figure 3:
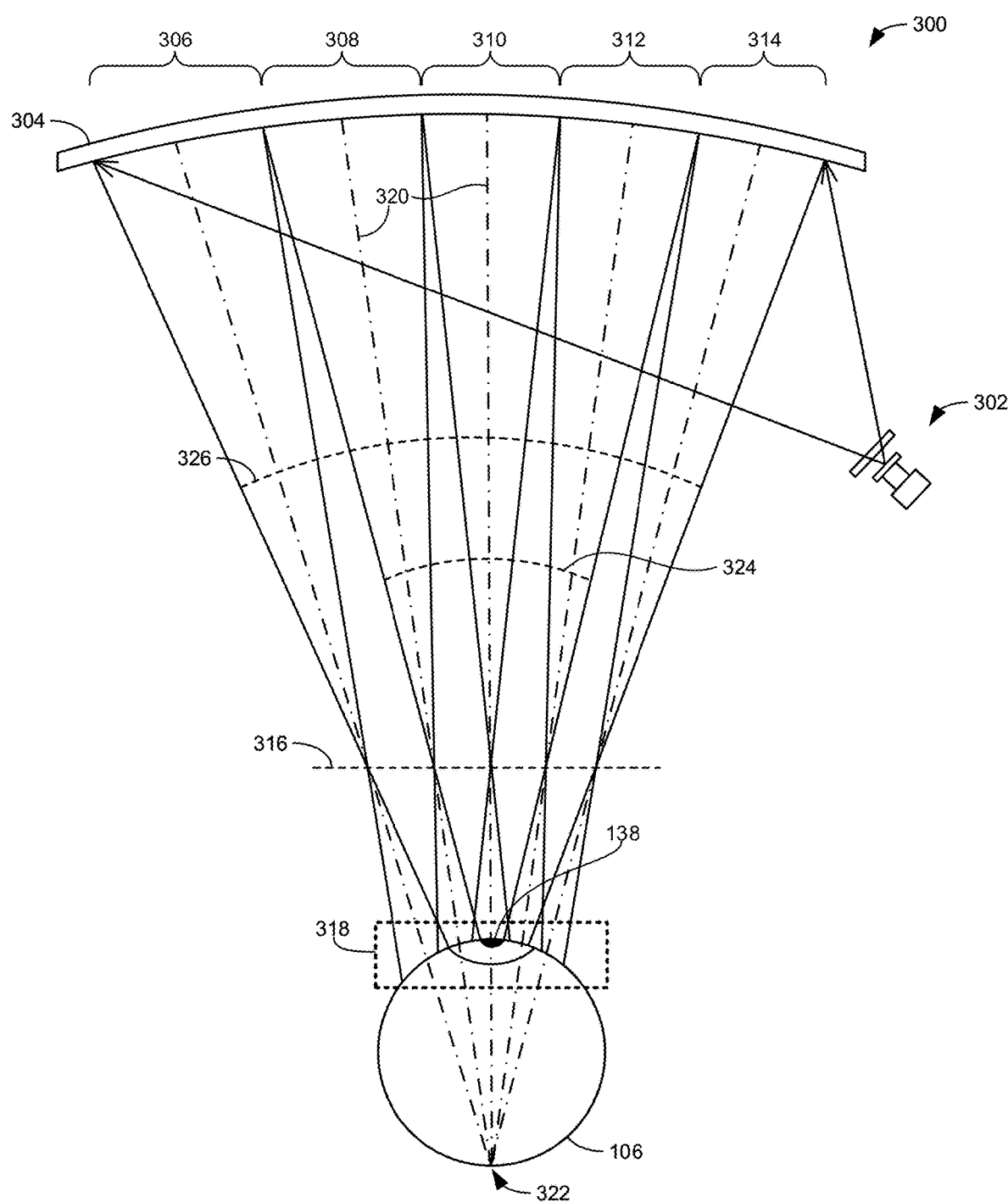
FIG. 3 illustrates another example AR system with an example HOE including another example optical function.

FIG. 3 illustrates an example AR system 300 constructed in accordance with teachings of this disclosure. The system 300 of FIG. 3 takes advantage of the higher resolution image described in connection with FIG. 2 and the larger FOV described in connection with FIG. 1. The example AR system 300 includes a projector 302 and a HOE 304. In this example, the projector 302 of FIG. 3 is similar or identical to the projector 102 of FIG. 1. However, the content represented by the full image (e.g., all the light) projected from the projector 302 of FIG. 3 is different than the content represented by the full image (e.g., all the light) projected from the projector 102 of FIG. 1. As with FIG. 1, the full image projected from the projector 302 of FIG. 3 corresponds to a plurality of sub-images 306, 308, 310, 312, 314. However, unlike the sub-images 124, 126, 128, 130, 132 of FIG. 1, the sub-images 306, 308, 310, 312, 314 of FIG. 3 are not identical to each other, but instead, each contains at least some non-repeating content with respect to other ones of the sub-images 306, 308, 310, 312, 314. Further, as explained below, adjacent ones of the sub-images 306, 308, 310, 312, 314 include some repeating or common content. That is, a first portion of ones of the sub-images may have overlapping content relative to other sub-images with a second portion that is non-overlapping content relative to the other sub-images. Further detail regarding the interrelationship of the content in the different sub-images 306, 308, 310, 312, 314 of FIG. 3 is described below in connection with FIG. 4.

The HOE 304 of FIG. 3 includes a different optical function than the HOEs 104, 204 of FIGS. 1 and/or 2. As represented in the illustrated example of FIG. 3, the optical function recorded in the HOE 304 causes the light associated with each respective sub-image 306, 308, 310, 312, 314 to converge at a focal plane 316 and then begin to diverge before reaching an eyebox 318 where a user's eye 106 is located. The distance between the focal plane 316 and the HOE 304 in FIG. 3 is greater than the distance between the focal plane 136 and the HOE 104 of FIG. 1. As described above, these distances correspond to the focal length of the respective HOEs 104, 304 with larger focal lengths resulting in a smaller FOV but providing a higher resolution. Thus, the example AR system 300 of FIG. 3 provides greater resolution than the AR system 100 of FIG. 1.

The reduction in the FOV of the HOE 304 of FIG. 3 caused by the greater focal length is offset by the optical function of the HOE 304 causing the chief rays 320 associated with the sub-images 306, 308, 310, 312, 314 (i.e., the central rays of the separate sub-images) to converge towards a focal point 322 beyond the eyebox 318 behind the pupil 138 of the eye 106. In the illustrated example of FIG. 3, the focal point 322 is located at the back of the user's eye 106 but may be positioned at different distances either inside the eye 106 or behind the back of the eye 106. In other examples, the chief rays 320 may converge at the pupil 138 of the eye 106. In other examples, the chief rays 320 may converge at a point in front of the pupil 138. As represented in the illustrated examples, causing the chief rays 320 of light for the separate sub-images 306, 308, 310, 312, 314 to converge behind the pupil 138, as shown in FIG. 3, enables a larger FOV (represented by the dashed line 324) for the AR system 300 of FIG. 3 than the FOV 212 of the AR system 200 of FIG. 2. That is, the FOV 324 of FIG. 3 corresponds to a much larger proportion of the total image field 326 than the FOV 212 of FIG. 2 relative to the corresponding total image field 214. As a result, increases in resolution from a longer focal length are achieved without being limited by an overly narrow FOV.

In addition to an increased optical resolution achieved by the longer focal length, the arrangement shown in FIG. 3 also enables a higher resolution for the perceived image than in FIG. 1 based on the way in which the separate sub-images 306, 308, 310, 312, 314 in FIG. 3 are combined to contribute to the perceived image viewed from the eyebox 318. As described above, the resolution for the perceived image generated by the AR system 100 of FIG. 1 corresponds to the size of a single one of the sub-images 124, 126, 128, 130, 132 because each of the separate sub-images 124, 126, 128, 130, 132 independently repeats the same content that makes up the perceived image. By contrast, the resolution for the perceived image generated by the AR system 300 of FIG. 3 corresponds to the size of the non-repeating content across all of the sub-images 306, 308, 310, 312, 314, which is greater than the size of a single sub-image. Put another way, the resolution for the perceived image generated by the AR system 300 of FIG. 3 corresponds to the size of a first one of the sub-images 306, 308, 310, 312, 314 plus the size of non-duplicative content represented in other ones of the sub-images 306, 308, 310, 312, 314 that is not common with the content in the first sub-image. This is illustrated more clearly in FIG. 4.

Figure 4:
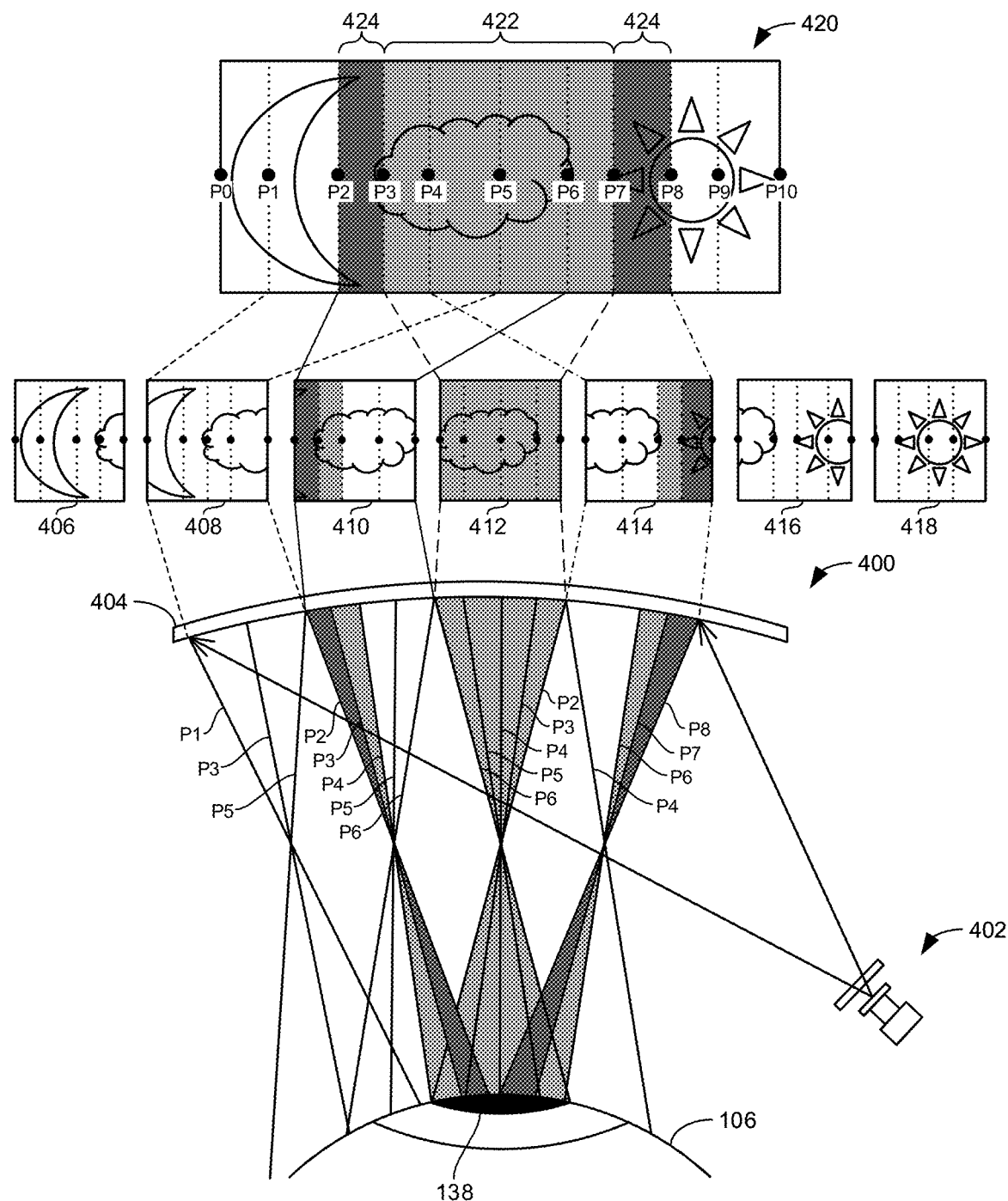
FIG. 4 illustrates another example AR system with an example HOE including another example optical function.

FIG. 4 illustrates an example AR system 400 constructed similar to the AR system 300 of FIG. 3. That is, the example AR system 400 of FIG. 4 includes a projector 402 similar or identical to the projector 302 of FIG. 3 and a HOE 404 that reflects the light from the projector with the chief rays for the different sub-images converging to a focal point beyond an eyebox for the HOE 404. FIG. 4 differs from FIG. 3 in that light projected from the projector 402 and reflected by the HOE 404 includes seven sub-images 406, 408, 410, 412, 414, 416, 418 instead of five shown in FIG. 3. In the illustrated example of FIG. 4, the content of the different sub-images 406, 408, 410, 412, 414, 416, 418 are represented as corresponding to different portions of a perceived image 420 including the moon, a cloud, and the sun. The perceived image 420 shown in the illustrated example includes eleven labelled pixels P0-P10 corresponding to the boundaries of different ones of the seven sub-images 406, 408, 410, 412, 414, 416, 418. For example, the first sub-image 406 corresponds to the left-most portion of the perceived image 420 extending between pixels P0 and P4, the second sub-image 406 corresponds to a shifted portion of the perceived image 420 extending from pixels P1 to P5, the third sub-image 408 corresponds to the portion of the perceived image 420 extending from pixels P2 to P6, the fourth sub-image 410 corresponds to the portion of the perceived image 420 extending from pixels P3 to P7, the fifth sub-image 412 corresponds to the portion of the perceived image 420 extending from pixels P4 to P8, the sixth sub-image 414 corresponds to the portion of the perceived image 420 extending from pixels P5 to P9, and the seventh sub-image 418 corresponds to the portion of the perceived image 420 extending from pixels P6 to P10. In some examples, the width and spacing (e.g., amount of overlap) of the sub-images 406, 408, 410, 412, 414, 416, 418 corresponding to successively shifted portions of the perceived image 420 may be consistent across the total width of the perceived image. In other examples, the width and/or the spacing of ones of the sub-images may be different than the width and/or spacing of different ones of the sub-images. Furthermore, there may be more or fewer sub-images used to form the total perceived image 420 than shown in FIG. 5. Further, while all of the sub-images 406, 408, 410, 412, 414, 416, 418 are shown arranged in a horizontal line, in some examples, the sub-images may be spaced vertically and/or spaced in both the horizontal and vertical directions to form a two-dimensional array of sub-images.

For the sake of clarity, only the second, third, fourth, and fifth sub-images 408, 410, 412, 414 are mapped to the perceived image 420 in FIG. 4 and to the HOE 404. Further, only the light rays associated with these four sub-images 408, 410, 412, 414 are represented as being reflected off the HOE 404 in FIG. 4. However, it should be understood that the projector 402 projects light corresponding to all seven sub-images 406, 408, 410, 412, 414, 416, 418, which is then reflected by the HOE 404 towards the user's eye 106. Thus, as described above, the combination of all the sub-images 406, 408, 410, 412, 414, 416, 418 corresponds to the full image projected by the projector 402. As is apparent from the illustrated example, the perceived image 420 (e.g., the content perceived by a user) is different than the full image (e.g., all the light) projected from the projector 402 because there is overlap in the content represented in adjacent ones of the sub-images 406, 408, 410, 412, 414, 416, 418. As explained above in connection with FIG. 1, light associated with different ones of the sub-images 406, 408, 410, 412, 414, 416, 418 may combine to compose the image as perceived by the user (e.g., the perceived image 420). For instance, as shown in the illustrated example, all of the light rays from the fourth sub-image 412 enter the pupil 138 of the eye 106; only some of the light rays associated with the third and fifth sub-images 410, 414 enter the pupil 138; and none of the light rays associated with the second sub-image 408 enter the pupil 138. Although not represented, none of the light rays from any of the other sub-images 406, 416, 418 enter the eye 106.

In the illustrated example of FIG. 4, the shaded portions of the light rays, the sub-images 406, 408, 410, 412, 414, 416, 418, and the perceived image 420 represent what the user perceives based on the current eye position. The non-shaded portions are indicative of content that cannot be perceived by the user based on the current eye position. That is, as with the AR system 200 of FIG. 2, users perceive less than all the content represented in the perceived image 420 for any given position of their eye within the eyebox but may perceive the entire image by moving their eye around.

The light shaded portions 422 correspond to content that is repeated between the different sub-images contributing to the current view (e.g., what the eye perceives if stationary) of the perceived image 420 (e.g., the third, fourth and fifth sub-images 410, 412, 414 in the illustrated example). Thus, as shown in the illustrated example, all of the content represented in the fourth sub-image 412 corresponds to content represented in either the third or fifth sub-images 410, 414. Although all of the content of the fourth sub-image 412 is repeated in portions of the third and fifth sub-images 410, 414, there are nevertheless portions of the content in the fourth sub-image 412 that uniquely contribute to the image perceived by the eye 106 because the light associated with the matching content in the other sub-images does not enter the pupil of the eye 106. That is, the fourth sub-image 412 is the only sub-image that contributes light corresponding to the content extending between pixels P4 and P6 in the perceived image 420 as viewed by the eye 106 shown in the illustrated example.

The dark shaded portions 424 correspond to non-repeating content among the different sub-images contributing to the user's view of the perceived image 420. In contrast with the fourth sub-image 412, portions of the third and fifth sub-images 410, 414 are unique relative to the other two sub-images contributing to the current view of the eye 106. That is, a portion of the third sub-image 410 includes content that is not included in either of the fourth or fifth sub-images 412, 414. For example, the light corresponding to the content between pixels P2 and P3 from the third sub-image 410 is content not included in the fourth or fifth sub-images 412, 414. As such, the content between pixels P2 and P3 is exclusively contributed to the user's perception of the image from the third sub-image 410. A similar situation applies in relation to the fifth sub-image 414 and the content between pixels P7 and P8. Of course, the content between pixels P2 and P3 and between pixels P7 and P8 is repeated in other ones of the sub-images, but these sub-images do not contribute to the portion of the perceived image 420 viewed by the eye 106 as shown in FIG. 1. In the illustrated example, at least some of the sub-images may have non-repeating content that is unique relative to all other sub-images. In particular, in the illustrated example of FIG. 4, the content between pixels P0 and P1 is only provided in the first sub-image 406. Likewise, the content between pixels P9 and P10 is only provided in the seventh sub-image 418.

Figure 5:
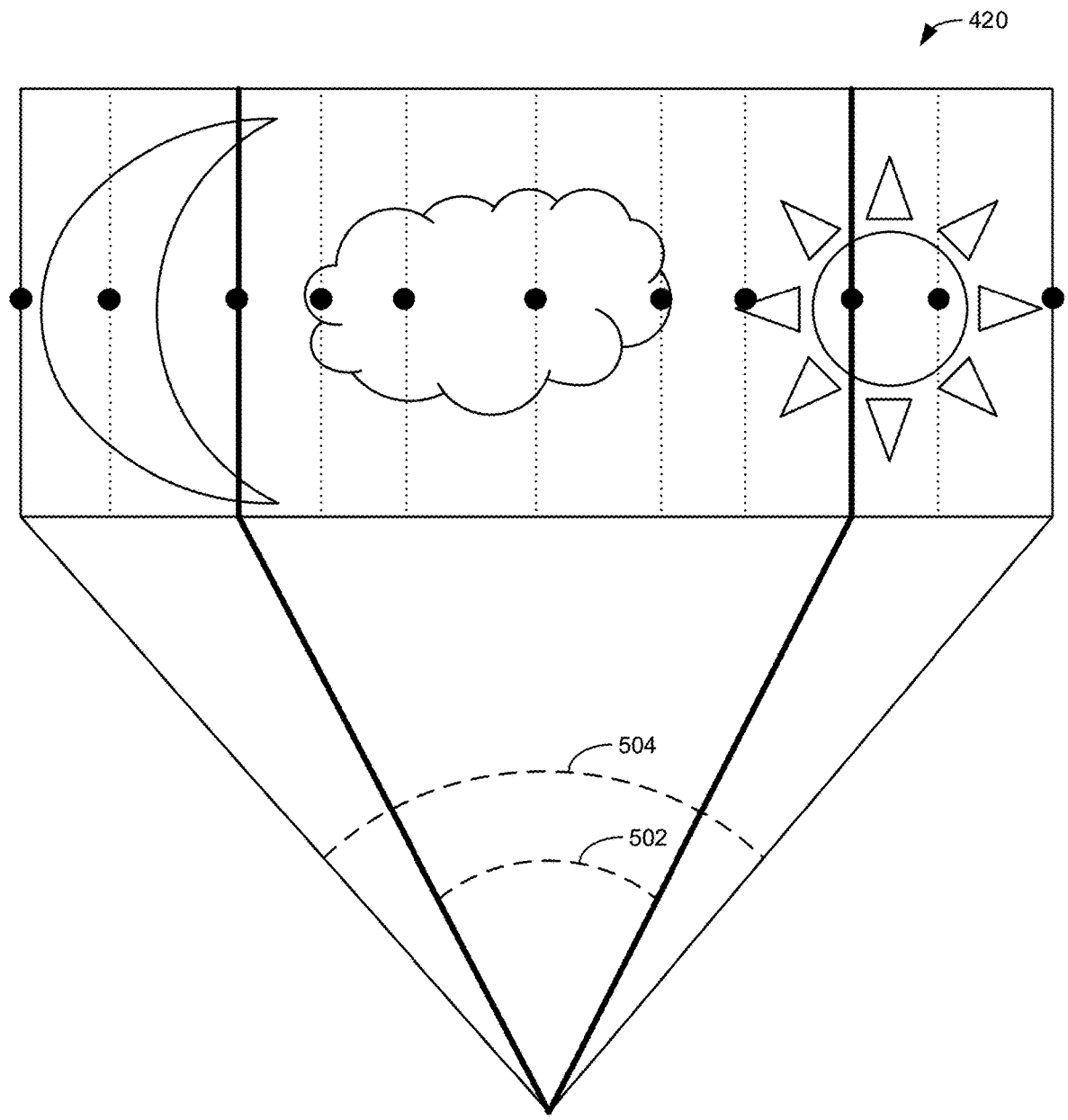
FIG. 5 illustrates the field of view achieved using the example AR system of FIG. 4.

FIG. 5 illustrates the perceived image 420 of FIG. 4 with dark lines to represent the FOV 502 of the perceived image 420 relative to the total image field 504 of the perceived image 420. While users cannot see the entire image 420 at a single instance in time, the FOV 502 enables users to view a much larger proportion of the perceived image 420 at a single time than would be possible using the AR system 200 of FIG. 2. The larger FOV 502 in FIG. 5 comes at some cost to the resolution of the perceived image 420 relative to the example AR system 200 of FIG. 2. However, as mentioned above, the resolution of the perceived image 420 in FIG. 5 is still greater than the resolution of the perceived image produced by the AR system 100 of FIG. 1. More specifically, returning to FIG. 4, the resolution of the perceived image 420 corresponds to the total size of the non-repeating content associated with the perceived image. For example, the first and fifth sub-images 406, 414 correspond to directly adjacent but non-overlapping portions of the perceived image 420. Specifically, the first sub-image 406 includes the content extending between pixels P0 and P4 and the fifth sub-image 414 includes the content extending between pixels P4 and P8. Additionally, approximately one half of the seventh sub-image 418 includes content (e.g., between pixels P8 and P10) that is non-repeating with the content in the first and fifth sub-images 406, 414. Accordingly, the resolution of the perceived image 420 corresponds to approximately the size of two and half of the sub-images. This is a significant improvement over the AR system 100 of FIG. 1, which has a resolution corresponding to a single one of the sub-images.

The particular resolution and the particular FOV for an AR system may be tailored to particular applications in accordance with teachings disclosed herein by selecting the number of sub-images, sub-image sizes, and focal length of the HOE along a continuum between the AR system 100 of FIG. 1 and the AR system 200 of FIG. 2. As described above, the AR system 100 of FIG. 1 has a relatively low resolution that corresponds to the size of an individual sub-image but a relatively large FOV that enables users to view the entire perceived image at a single point in time (e.g., without having to move the eye around). At the other end of the spectrum, the example AR system 200 of FIG. 2 provides relatively high resolution because there is only a single unitary image 206. However, the FOV of the AR system 200 is relatively small such that only a small portion of the perceived image (e.g., the unitary image 206) is visible at one time. Examples disclosed herein enable the design and construction of AR systems that strike suitable balances between these two extremes to achieve relatively wide FOVs while also providing relatively high resolutions.

Figure 6:
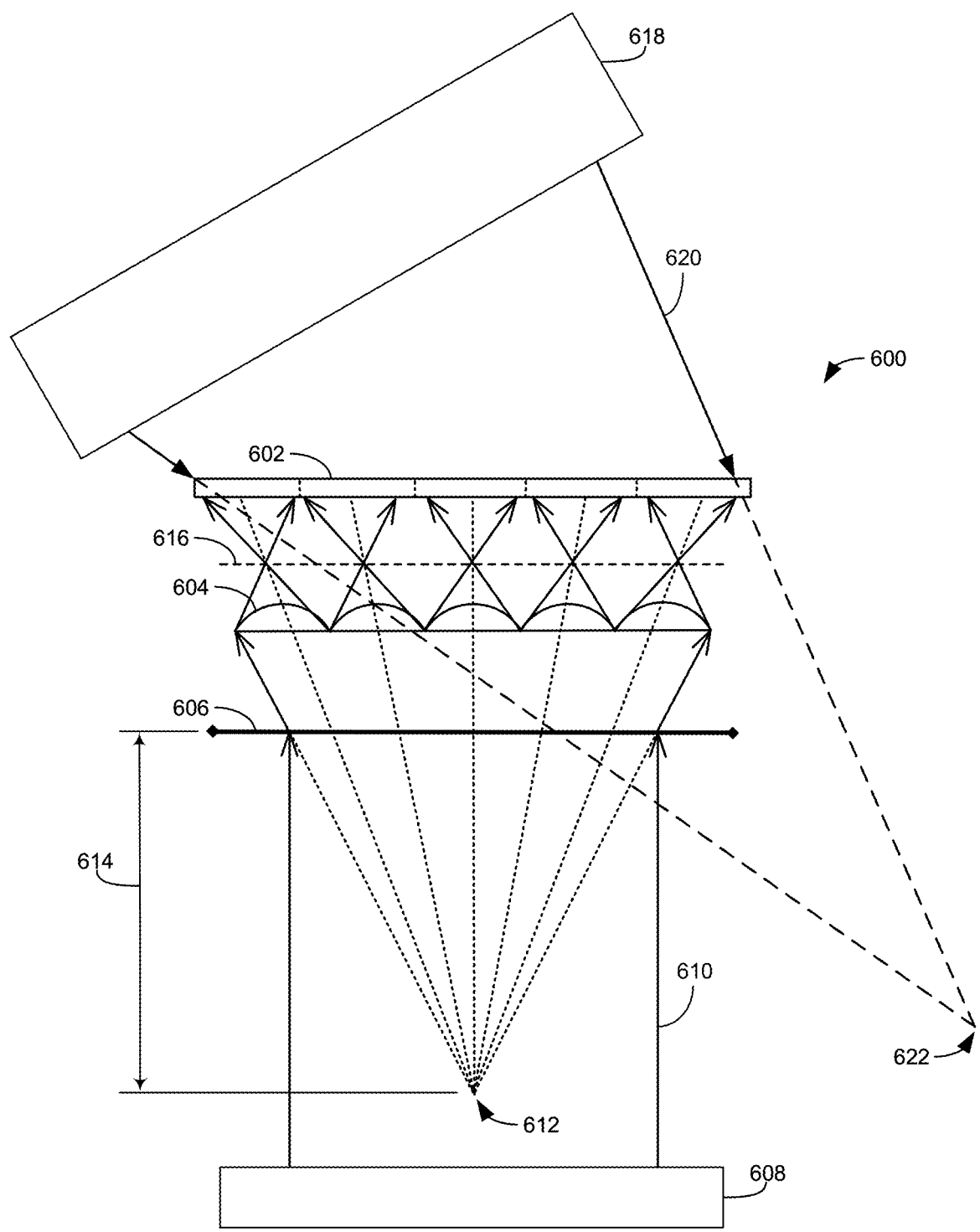
FIG. 6 illustrates an example system to record an example optical function into an example HOE to implement the example AR systems of FIGS. 2-4.

FIG. 6 illustrates an example system 600 to record an optical function into the HOE 602 that may be used to implement the example AR systems 200, 300, 400 of FIGS. 2-4. For purposes of illustration, the HOE 602 is shown to be flat, but may be curved in the same manner as the HOEs 204 304, 404 of FIGS. 2-4. In some examples, the HOE 602 corresponds to a reflective volume hologram. An advantage of recording an optical function into a reflective volume hologram is that the HOE 602 can be any desired shape and/or have any suitable physical structure. As described above, in some examples, the HOE 602 is curved to correspond to the curvature of normal eye glasses.

In the illustrated example, the HOE 602 is positioned a distance from a microlens array 604. As shown in the illustrated example, the lens array 604 includes a series of lenses. The number of lenses in the lens array 604 corresponds to the number of sub-images intended to be reflected by the HOE 602. Thus, to record the optical function associated with the HOE 204 of FIG. 2, the lens array 604 may be replaced by a single lens because the HOE 204 is intended to reflect a single unitary image rather than multiple sub-images.

The example system 600 also includes decollimation lens 606 that is positioned in alignment with the lens array 604 and the HOE 602 as shown in FIG. 6. In the illustrated example, the decollimation lens 606 is a diverging lens. To record an optical function in the HOE 602, a first light source 608 generates a first beam of light 610 directed towards the diverging lens 606. In some examples, the first beam of light 610 is a collimated beam of light such that all light rays in the beam are in parallel. As the first beam of light 610 passes through the diverging lens 606, the light rays diverge outward from a focal point 612 defined by a focal length 614 of the diverging lens 606. In some examples, the focal length 614 defines the location of the focal points 208, 322 at which the chief rays of the light reflected off the HOE is to converge. After the rays of the first beam of light 610 pass through the diverging lens 606, the rays next pass through the lens array 604 towards the HOE 602. The lens array 604 refocuses the light and causes discrete portions of the rays to converge at different points on a focal plane 616 before diverging and then hitting the HOE 602. In some examples, the dimensions, shapes, and/or focal lengths of the individual lenses in lens array 604 may differ from one another. The lenses in the lens array 604 may have different sizes, different shapes, be aspherical, achromatic, diffractive, etc.

At the same time that the first beam of light 610 is being directed towards the HOE 602 as described above, a second light source 618 generates a second beam of light 620. In some examples, the second beam of light 620 and the first beam of light 610 are directed toward opposite sides of HOE 602. As shown in the illustrated example, the second beam of light 620 converges towards a second focal point 622. In some examples, the location of the second focal point 622 relative to the HOE 602 corresponds to the position of the scanning mirror 112 implemented in the projectors 202, 302, 402 of FIGS. 2-4.

The HOE 602 is a photopolymer that reacts to light. In some examples, the HOE 602 is transparent to allow light to pass therethrough. The transparent nature of the HOE 602 enables the HOE 602 to be implemented in AR devices that allow users to view the real-world (through the HOE 602) while also viewing computer-generated perceptual information overlaid on the real-world view (reflected off the HOE 602). In other examples, the HOE 602 may be implemented in virtual reality devices. In some such examples, the HOE 602 may not be transparent. The optical function for the HOE 602 is recorded in the HOE by the interference of the first and second beams of light 610, 620 passing through the HOE. Once the optical function is recorded into the HOE 602 in this manner, light projected onto the HOE from the second focal point 622 (i.e., in the opposite direction to the second beam of light 620) will be reflected off the HOE to follow the reverse path of the first beam of light 610 produced by passing through the diverging lens 606 and lens array 604. Of course, during implementation, the diverging lens 606 and lens array 604 will no longer be present such that the path of reflected light will correspond to the paths of light as shown in FIGS. 2-4.

Figure 7:
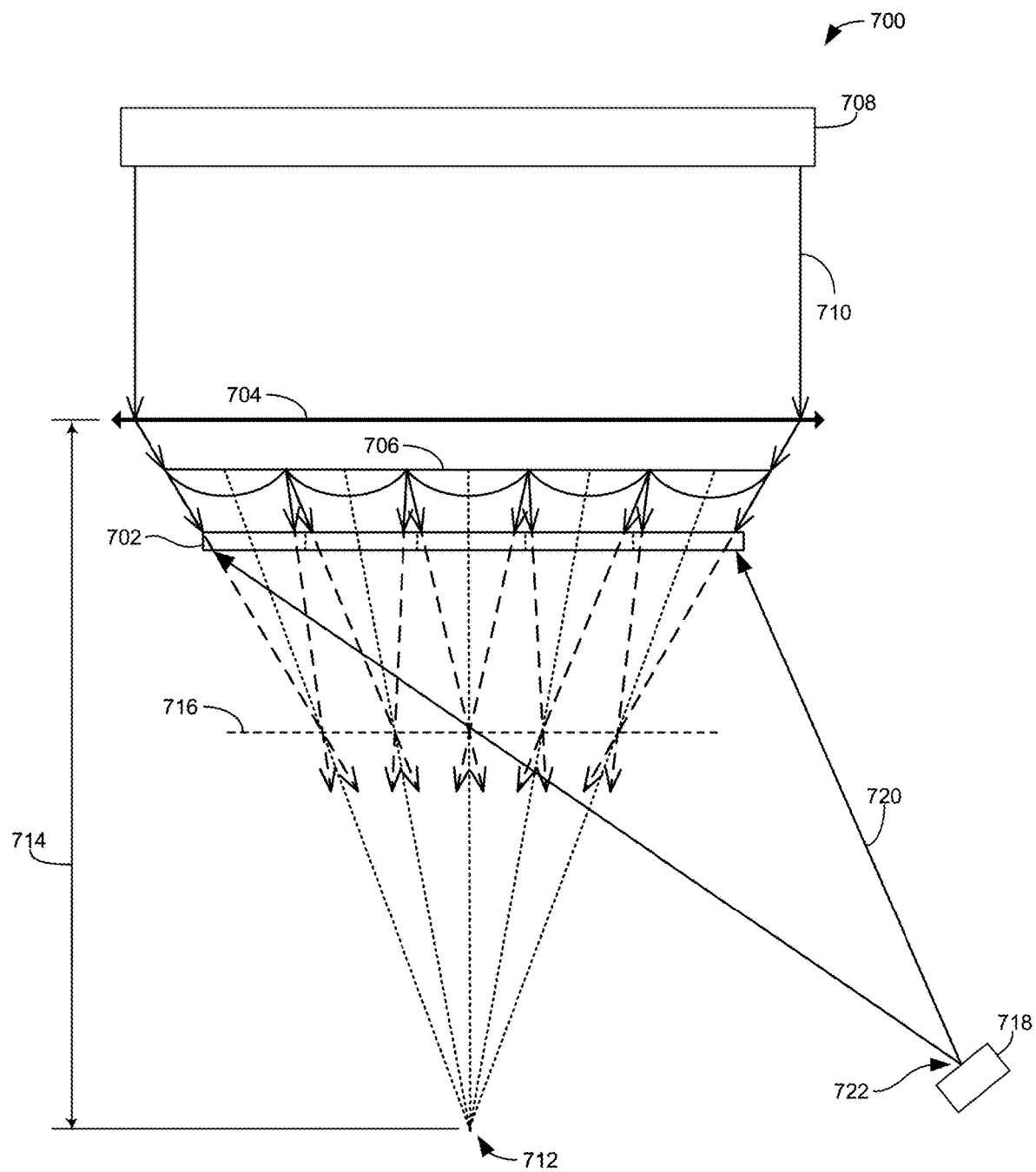
FIG. 7 illustrates another example system to record an example optical function into an example HOE to implement the example AR systems of FIGS. 2-4.

FIG. 7 illustrates another example system 700 to record an optical function into the HOE 702 that may be used to implement the example AR systems 200, 300, 400 of FIGS. 2-4. For purposes of illustration, the HOE 702 is shown to be flat, but may be curved in the same manner as the HOEs 204 304, 404 of FIGS. 2-4. The HOE 702 of FIG. 7 may be the similar or identical to the HOE 602 of FIG. 6. In the illustrated example of FIG. 7, the system 700 includes a microlens array 704 positioned between the HOE 702 and a decollimation lens 706. Unlike the decollimation lens 606 of FIG. 6, the decollimation lens 706 of the example system 700 of FIG. 7 is a converging lens.

To record an optical function in the HOE 702, a first light source 708 generates a first beam of light 710 directed towards the converging lens 706. In some examples, the first beam of light 710 is a collimated beam of light such that all light rays in the beam are in parallel. As the first beam of light 710 passes through the converging lens 706, the light rays converge toward a focal point 712 defined by a focal length 714 of the converging lens 706. In some examples, the focal length 714 defines the location of the focal points 208, 322 at which the chief rays of the light reflected off the HOE is to converge. After the rays of the first beam of light 710 pass through the converging lens 706, the rays next pass through the lens array 704 towards the HOE 702. The lens array 704 refocuses the light and causes discrete portions of the rays to converge toward different points on a focal plane 716 as the light hits the HOE 702 as shown in the illustrated example. In some examples, the dimensions, shapes, and/or focal lengths of the individual lenses in lens array 704 may differ from one another. The lenses in the lens array 704 may have different sizes, different shapes, be aspherical, achromatic, diffractive, etc.

At the same time that the first beam of light 710 is being directed towards the HOE 702 as described above, a second light source 718 generates a second beam of light 720. In some examples, the second beam of light 720 and the first beam of light 710 are directed toward opposite sides of HOE 702. As shown in the illustrated example, the second beam of light 720 diverges outwards from a second focal point 722. In some examples, the location of the second focal point 722 relative to the HOE 702 corresponds to the position of the scanning mirror 112 implemented in the projectors 202, 302, 402 of FIGS. 2-4. That is, the second light source 718 is positioned at the same location as the scanning mirror 112.

As described above with respect to FIG. 6, the HOE 702 is a photopolymer that reacts to light. As a result, the optical function for the HOE 702 is recorded in the HOE by the interference of the first and second beams of light 710, 720 passing through the HOE. Once the optical function is recorded into the HOE 702 in this manner, light projected onto the HOE from the second focal point 722 (i.e., in the direction of the second beam of light 720) will be reflected off the HOE to follow the path of the first beam of light 710 produced by passing through the converging lens 706 and lens array 704.

Figure 8:
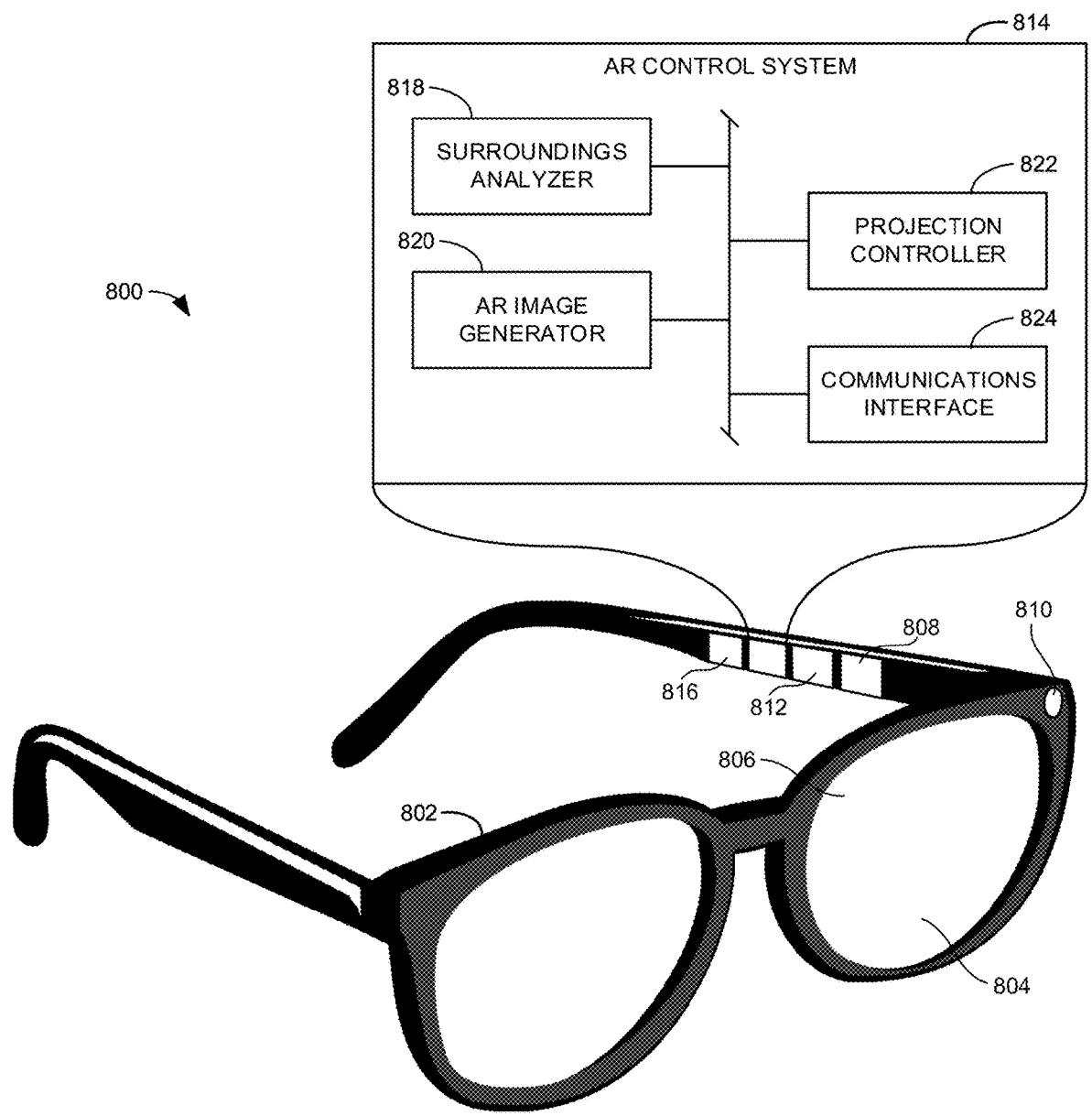
FIG. 8 illustrates an example AR device including one or more of the example AR systems of FIGS. 2-4.

FIG. 8 illustrates an example AR device 800 constructed in accordance with teachings disclosed herein. The example AR device 800 includes a frame 802 to hold one or more eyepiece lenses 804 that include a HOE 806 with an optical function recorded thereon. While the frame 802 is shown as a pair of eye glasses, the frame may correspond to any suitable wearable AR device. In some examples, the HOE 806 is constructed similar to the HOEs 204, 304, 404 of FIGS. 2-4. The HOE 806 may be integrated with the eyepiece lens 804 or manufactured separately therefrom and affixed to a surface of the eyepiece lens 804. In some examples, a separate HOE 806 is associated with each eyepiece lens 804. In the illustrated example, a projector 808 is positioned within the frame 802 at a location providing a direct line of sight with the HOE 806 to project light toward the HOE 806 through free space. In some examples, the projector 808 may be similar or identical to any of the projectors 102, 202, 302, 402 of FIGS. 1-4.

In some examples, the AR device 800 includes one or more image sensors 810 (e.g., a camera) to capture images of an environment surrounding the AR device 800. The example AR device 800 may also include one or more other sensors 812 to determine a position and/or orientation of the AR device 800 relative to the surrounding environment. The other sensors 812 may include motion sensors (e.g., accelerometers, gyroscopes, etc.), location sensors (e.g., a global positioning system, magnetometers, etc.), depth sensors, etc.

In the illustrated example, the AR device 800 includes an example AR control system 814. The projector 808, the image sensor 810, the other sensors 812, and/or the AR control system 814 may be powered by a power source 816. In some examples, the power source 816 is a battery or other power supply incorporated into in the frame 802 of the AR device 800. In other examples, the power source 816 may be a physical interface used to connect an external power supply.

As shown in the illustrated example, the AR control system 814 includes an example surroundings analyzer 818, an example AR image generator 820, an example projection controller 822, and an example communications interface 824. The example surroundings analyzer 818 analyzes images captured by the image sensor 810 and/or feedback from the other sensors 812 to identify objects and/or circumstances in a surrounding environment and determine the positional relationship of the AR device 800 relative to such objects and/or circumstances. The example AR image generator 820 generates an AR image to be projected onto the HOE 806 to enhance or augment a user's view of the surrounding environment through the eyepiece lenses 804. The example projection controller 822 controls the operation of the projector 808 based on the AR image generated by the AR image generator 820. For example, the projection controller 822 controls when the light source 108 projects light and/or the particular color of light (if, for example, the light source 108 includes different colors of light sources). Further, the projection controller 822 controls the movement of the scanning mirror 112 to direct the light produced by the light source 108 to the correct location on the HOE 806. The example communications interface 824 enables communications between the AR control system 814 and the other components on the AR device 800. In some examples, one or more of the surroundings analyzer 818, the AR image generator 820, and/or the projection controller 822 are implemented on a separate device external to the AR device 800 In such examples, the communications interface 824 enables communications between the external device and the components on the AR device 800.

While an example manner of implementing the AR control system 814 of FIG. 8 is illustrated in FIG. 8, one or more of the elements, processes and/or devices illustrated in FIG. 4 may be combined, divided, re-arranged, omitted, eliminated and/or implemented in any other way. Further, the example surroundings analyzer 818, the example AR image generator 820, the example projection controller 822, the example communications interface 824 and/or, more generally, the example AR control system 814 of FIG. 8 may be implemented by hardware, software, firmware and/or any combination of hardware, software and/or firmware. Thus, for example, any of the example surroundings analyzer 818, the example AR image generator 820, the example projection controller 822, the example communications interface 824 and/or, more generally, the example AR control system 814 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example surroundings analyzer 818, the example AR image generator 820, the example projection controller 822, and/or the example communications interface 824 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AR control system 814 of FIG. 8 may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
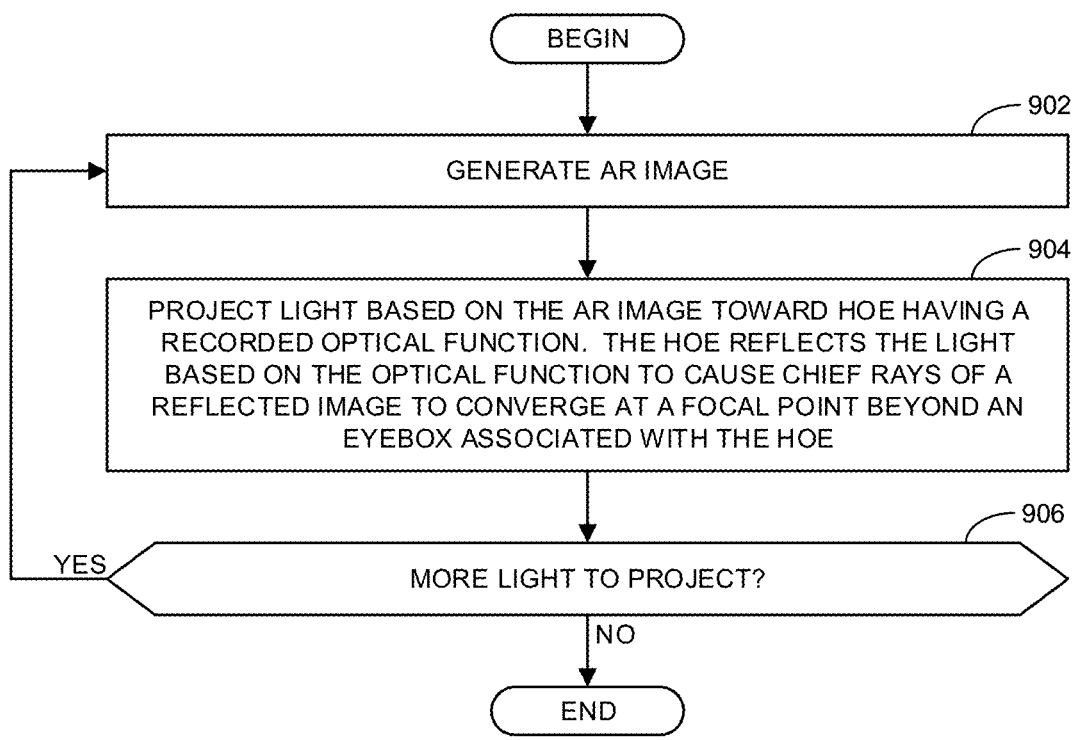
FIG. 9 is a flowchart representative of example machine readable instructions which may be executed to implement the example AR systems of FIGS. 2-4.

A flowchart representative of example hardware logic, machine readable instructions, hardware implemented state machines, and/or any combination thereof for implementing the AR device 800 of FIG. 8 is shown in FIG. 9. The machine readable instructions may be an executable program or portion of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 9, many other methods of implementing the example AR device 800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The process of FIG. 9 begins at block 902 where the example AR image generator 820 generates an AR image (e.g., the perceived image 420 of FIG. 4). At block 904, the example projector 808 projects light based on the AR image toward the HOE 806 having a recorded optical function. The HOE 806 reflects the light based on the optical function to cause chief rays of a reflected image to converge at a focal point beyond an eyebox associated with the HOE 806. At block 906, the example projection controller 822 determines whether there is more light to project. If so, control returns to block 902. Otherwise, the example process of FIG. 9 ends.

Figure 10:
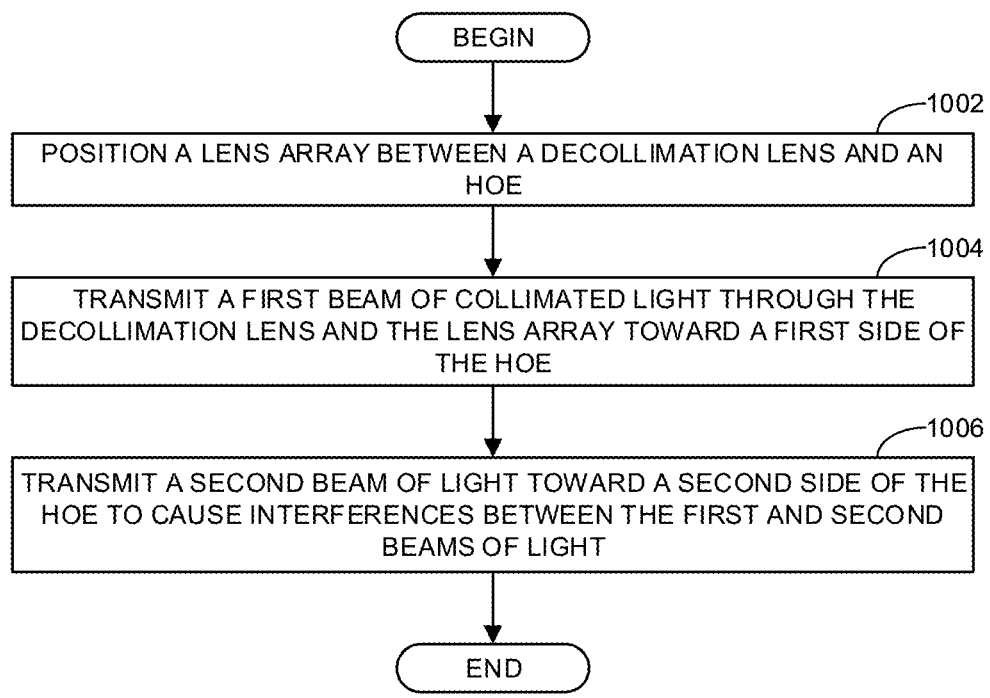
FIG. 10 is a flowchart representative of an example process to record an optical function in an unprocessed HOE to manufacture the example HOEs of FIGS. 2-4.

FIG. 10 is a flowchart representative of an example process to record an optical function in an unprocessed HOE to manufacture the HOEs 204, 304, 404, 806 of FIGS. 2-4 and/or 8. The example process begins at block 1002 by positioning a lens array 604, 704 between a decollimation lens (e.g., the diverging lens 606 or the converging lens 706) and a HOE 602, 702. At block 1004, the process includes transmitting a first beam of collimated light 610, 710 through the decollimation lens 606, 706 and the lens array 604, 704 toward a first side of the HOE 602, 702. At block 1006, the process includes transmitting a second beam of light 620, 720 toward a second side of the HOE 602 to cause interferences between the first and second beams of light 610, 620. Thereafter, the example process of FIG. 10 ends.

Figure 11:
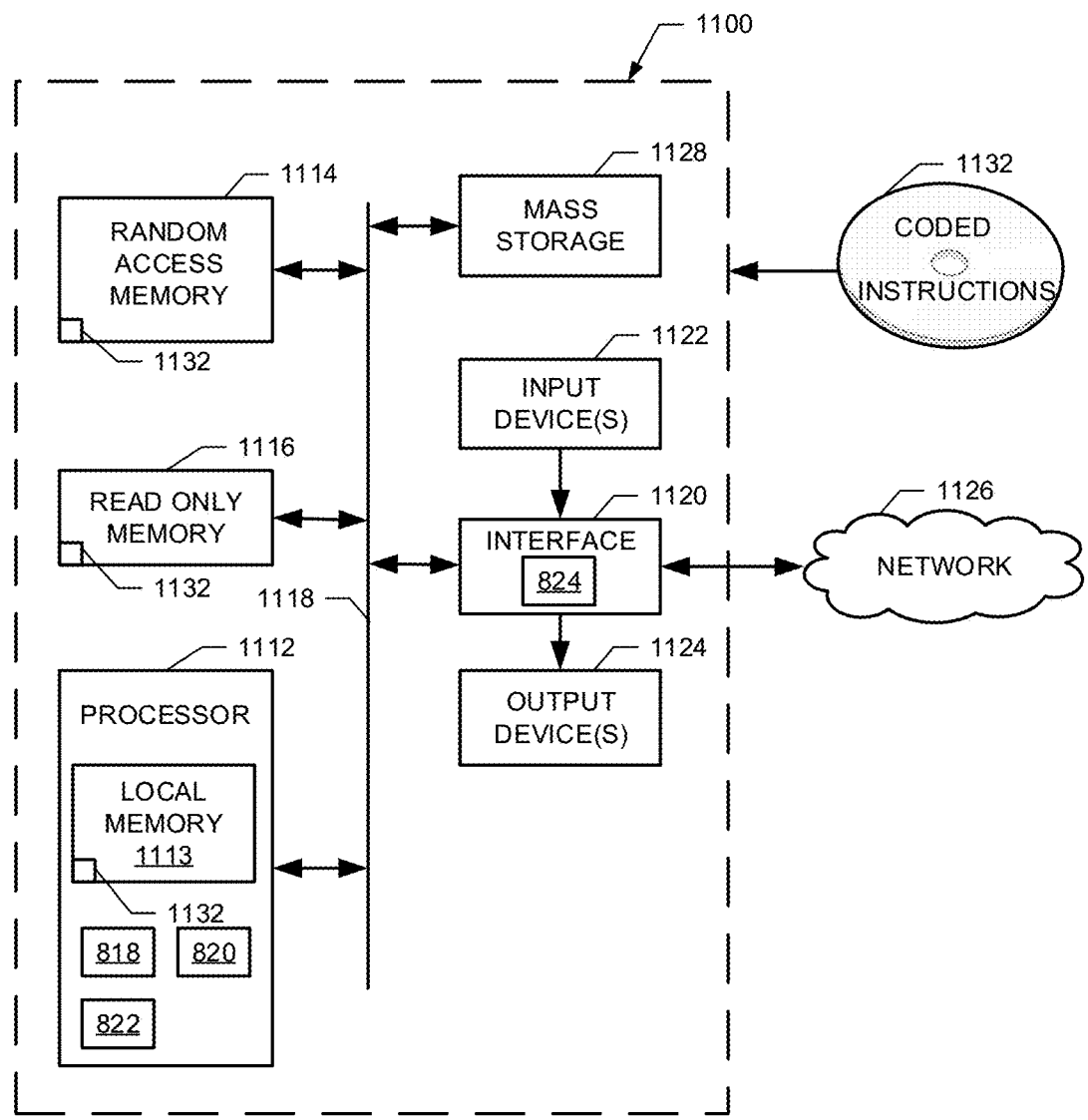
FIG. 11 is a block diagram of an example processor platform structured to execute the instructions of FIG. 9 to implement the AR device of FIG. 8.

FIG. 11 is a block diagram of an example processor platform 1100 structured to execute the instructions of FIG. 9 to implement the AR device 800 of FIG. 8. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example surroundings analyzer 818, the example AR image generator 820, and the example projection controller 822.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface. In this example, the interface circuit 1120 implements the example communications interface 824.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 9 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that enable HOEs that enables AR images with higher resolutions and/or larger FOVs than previously known solutions based on components capable of being concealed and/or otherwise incorporated into the frames of normal eyewear. This is made possible by recording optical functions in such HOEs that cause the chief rays of one or more images from a projector to converge at a focal point beyond an eyebox for the HOE (corresponding to the location of a pupil when a user is viewing the image(s)). The rays converging beyond the eyebox enable a large eyebox and higher resolution. Further, the use of multiple sub-images with portions containing non-repeating content enables larger FOVs.

Example 1 includes an augmented reality (AR) device comprising a holographic optical element (HOE) including a recorded optical function, and a projector to emit light toward the HOE, the HOE to reflect the light based on the optical function to produce a full image corresponding to content perceivable by a user viewing the reflected light from within an eyebox, a first portion of the content viewable from a first location within the eyebox, a second portion of the content viewable from a second location within the eyebox, the first portion including different content than the second portion that is non-repeating between the first and second portions.

Example 2 includes the AR device as defined in example 1, wherein the full image is composed of portions of the light associated with different ones of a plurality of sub-images, the HOE to reflect the light based on the optical function so that chief light rays for the plurality of sub-images converge to a focal point, the eyebox located between the focal point and the HOE.

Example 3 includes the AR device as defined in example 2, wherein a first sub-image of the plurality of sub-images includes the first portion of the content of the full image and a second sub-image of the plurality of sub-images includes the second portion of the content.

Example 4 includes the AR device as defined in example 3, wherein the first sub-image and the second sub-image include a same portion of the full image.

Example 5 includes the AR device as defined in any one of examples 1-4, wherein the HOE is transparent.

Example 6 includes the AR device as defined in any one of examples 1-5, wherein the HOE is a reflective volume hologram.

Example 7 includes the AR device as defined in any one of examples 1-6, wherein the HOE is curved.

Example 8 includes the AR device as defined in any one of examples 1-7, wherein the projector includes a red light source, a green light source, and a blue light source.

Example 9 includes the AR device as defined in any one of examples 1-8, wherein the light is projected through free space between the projector and the HOE.

Example 10 includes the AR device as defined in example 1, further including a frame wearable by the user, the frame to support the projector, and an eyepiece lens within the frame, the HOE positioned on the eyepiece lens.

Example 11 includes an augmented reality (AR) device comprising a projector to project light associated with first and second sub-images, and a holographic optical element (HOE) including an optical function recorded therein, the HOE to reflect the first and second sub-images toward an eyebox based on the optical function, the first sub-image including first content corresponding to a first portion of a full image perceivable by a user from the eyebox, the second sub-image including second content corresponding to a second portion of the full image, the first sub-image not including the second content.

Example 12 includes the AR device as defined in example 11, wherein the full image is composed of portions of the light associated with the first and second sub-images.

Example 13 includes the AR device as defined in any one of examples 11 or 12, wherein the HOE is to reflect the light based on the optical function so that chief light rays for the first and second sub-images converge to a point behind a pupil of the user viewing the full image from the eyebox.

Example 14 includes the AR device as defined in any one of examples 11-13, wherein both the first and second sub-image include third content corresponding to a third portion of the full image.

Example 15 includes the AR device as defined in any one of examples 11-14, wherein the HOE is transparent.

Example 16 includes the AR device as defined in any one of examples 11-15, wherein the HOE is a reflective volume hologram.

Example 17 includes the AR device as defined in any one of examples 11-16, wherein the HOE is curved.

Example 18 includes the AR device as defined in any one of examples 11-17, wherein the projector includes a red light source, a green light source, and a blue light source.

Example 19 includes the AR device as defined in any one of examples 11-18, wherein the light is projected through free space between the projector and the HOE.

Example 20 includes the AR device as defined in any one of examples 11-19, further including a frame wearable by the user, the frame to support the projector, and an eyepiece lens within the frame, the HOE incorporated into the eyepiece lens.

Example 21 includes a system comprising a holographic optical element (HOE), a first light source to direct a first beam of light toward the HOE from a first direction, the first beam of light being collimated, a second light source to direct a second beam of light toward the HOE from a second direction, and a decollimation lens positioned between the first light source and the HOE, the decollimation lens to decollimate the first beam of light.

Example 22 includes the system as defined in example 21, wherein a focal length of the decollimation lens defines a focal point for chief rays of sub-images to be reflected off the HOE from a projector.

Example 23 includes the system as defined in example 22, wherein the decollimation lens is a diverging lens, the diverging lens positioned between the focal point for the chief rays and the HOE.

Example 24 includes the system as defined in example 23, wherein the second beam of light is to converge towards a second focal point, the second focal point defining a location for the projector.

Example 25 includes the system as defined in example 22, wherein the decollimation lens is a converging lens, the HOE positioned between the focal point for the chief rays and the converging lens.

Example 26 includes the system as defined in example 25, wherein the second beam of light is to diverge outward from a second focal point, the second focal point defining a location for the projector.

Example 27 includes the system as defined in any one of examples 22-26, further including a lens array positioned between the decollimation lens and the HOE, the lens array to focus separate portions of the first beam of light to separate focal points on a focal plane between the focal point for the chief rays and the HOE.

Example 28 includes a method comprising positioning a decollimation lens adjacent to a holographic optical element (HOE), transmitting a first beam of light through the decollimation lens towards a first side of the HOE, and transmitting a second beam of light towards a second side of the HOE Example 29 includes the method as defined in example 28, defining a focal point for chief rays of sub-images to be reflected off the HOE from a projector based on a focal length of the decollimation lens.

Example 30 includes the method as defined in example 29, further including positioning the decollimation lens between the focal point for the chief rays and the HOE, the decollimation lens being a diverging lens.

Example 31 includes the method as defined in example 30, wherein the second beam of light is to converge towards a second focal point, the method further including defining a location for the projector based on a location of the second focal point.

Example 32 includes the method as defined in example 29, further including positioning the HOE between the focal point for the chief rays and the decollimation lens, the decollimation lens being a converging lens.

Example 33 includes the method as defined in example 32, wherein the second beam of light is to diverge from a second focal point, the method further including defining a location for the projector based on a location of the second focal point.

Example 34 includes the method as defined in any one of examples 29-33, further including positioning a lens array between the decollimation lens and the HOE to focus separate portions of the first beam of light to separate focal points on a focal plane between the focal point for the chief rays and the HOE.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An augmented reality (AR) device comprising:
   a holographic optical element (HOE) including a recorded optical function; and
   a projector to emit light toward the HOE, the HOE to reflect the light based on the recorded optical function to produce a full image corresponding to content perceivable by an eye of a user viewing the reflected light from within an eyebox, a first portion of the full image viewable by the eye of the user when the eye is at a first location within the eyebox, a second portion of the full image viewable by the eye of the user when the eye is at a second location within the eyebox, the first portion of the full image not viewable by the eye of the user when the eye is at the second location, the second portion of the full image not viewable by the eye of the user when the eye is at the first location, the first portion including different content than the second portion that is non-repeating between the first and second portions.

2. The AR device as defined in claim 1, wherein the full image is composed of portions of the light associated with different ones of a plurality of sub-images, the HOE to reflect the light based on the recorded optical function so that chief light rays for the plurality of sub-images converge to a focal point, the eyebox located between the focal point and the HOE.

3. The AR device as defined in claim 2, wherein a first sub-image of the plurality of sub-images includes the first portion of the full image and a second sub-image of the plurality of sub-images includes the second portion of the full image.

4. The AR device as defined in claim 3, wherein the first sub-image and the second sub-image include repeating content represented in the full image.

5. The AR device as defined in claim 1, wherein the HOE is transparent.

6. The AR device as defined in claim 1, further including:
   a frame wearable by the user, the frame to support the projector; and
   an eyepiece lens within the frame, the HOE positioned on the eyepiece lens.

7. The AR device as defined in claim 1, wherein a first set of portions of the full image viewable from the first location correspond to a first region of a perceived image, and a second set of portions of the full image viewable from the second location correspond to a second region of the perceived image, the first region being shifted relative to the second region within the perceived image.

8. The AR device as defined in claim 2, wherein the plurality of sub-images are arranged within a two-dimensional array of sub-images within the full image.

9. The AR device as defined in claim 3, wherein the first sub-image of the full image is directly adjacent to the second sub-image of the full image such that the first sub-image and the second sub-image share a common edge between them.

10. The AR device as defined in claim 3, wherein the first sub-image and the second sub-image have different widths.

* * * * *